Oct. 29, 1968     W. R. STRUBLE ET AL     3,408,005
SNOW MAKING NOZZLE
Filed May 9, 1966
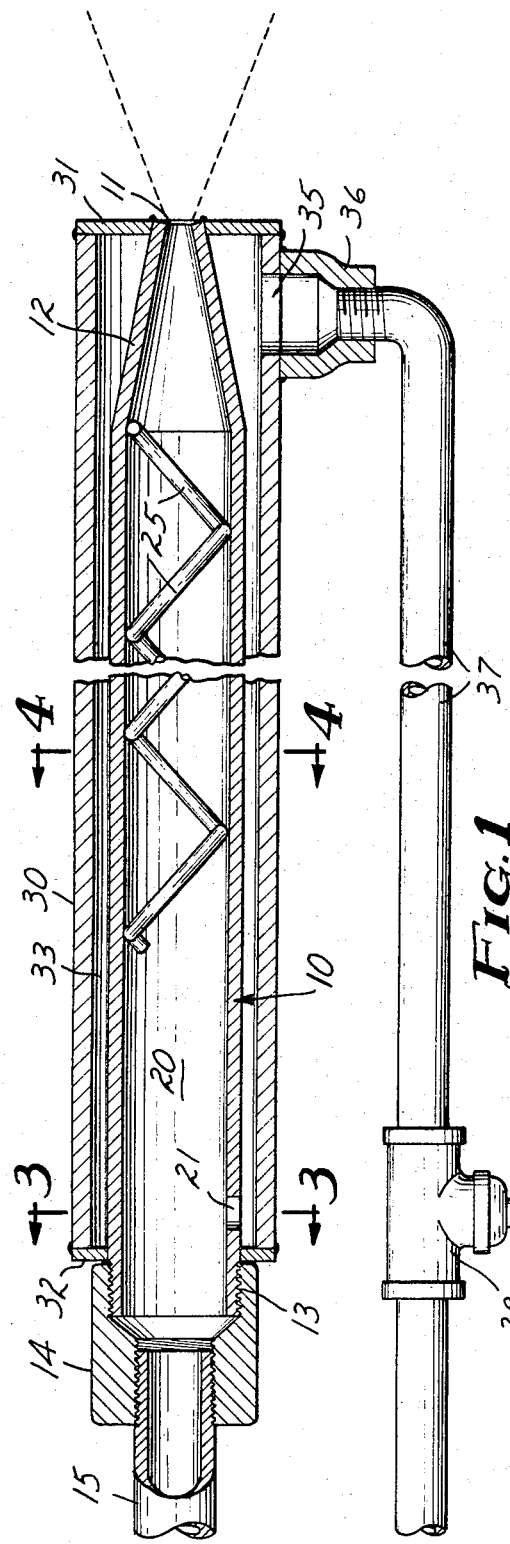
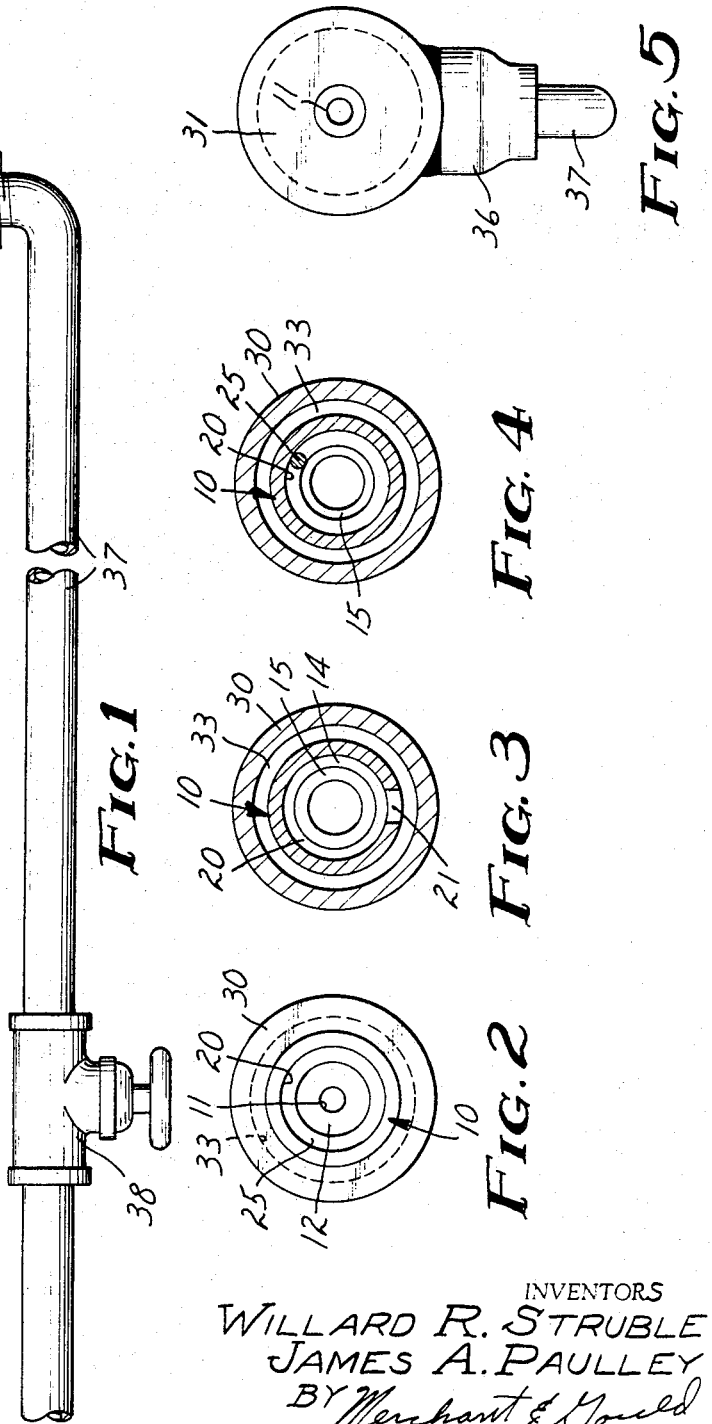
INVENTORS
WILLARD R. STRUBLE
JAMES A. PAULLEY
BY Merchant & Gould
ATTORNEYS

United States Patent Office 3,408,005
Patented Oct. 29, 1968

3,408,005
SNOW MAKING NOZZLE
Willard R. Struble, Box 15, Jacobson, Minn. 55752, and James A. Paulley, Rte. 1, Box 133, Cohasset, Minn. 55721
Filed May 9, 1966, Ser. No. 548,622
4 Claims. (Cl. 239—14)

ABSTRACT OF THE DISCLOSURE

An inner chamber having a nozzle at one end and an inlet for air at the other end with an inlet for water oriented approximately perpendicular to the air inlet and a jacket surrounding the nozzle and part of the mixing chamber to prevent freezing thereof having a water inlet adjacent the nozzle and in communication with the water inlet of the inner chamber.

---

This invention pertains to a new and improved snow making nozzle and more particularly to a snow making nozzle which is completely protected from freezing closed and has additional features whereby it will produce a much improved snow cover.

In recent years many winter sports, such as skiing and the like, have become so popular that many commercial areas have been established wherein facilities are provided for the public to participate in the sports. In general the amount and type of snow available at these areas determines the ultimate commercial success thereof. A great many of these areas, especially in the middle and eastern portion of the United States, now include apparatus for producing artificial snow. By producing artificial snow these areas can insure a better grade of snow and a larger quantity of snow, thereby, effecting more uniform snow conditions and a longer period during which the public can participate in the snow sports without depending directly on the weather.

In general, prior art snow making apparatus consists of a device receiving water under pressure and having means therein for converting the water to a fine mist or fine droplets which eventually freeze in the form of fine ice particles. These prior art devices are extremely inefficient since the moisture has a tendency to collect thereon and freeze so that the spray pattern is changed and portions of the area are not adequately covered with snow. Also, as the spraying continues the ice continues to build up on the device and eventually will close it completely. Thus, these prior art devices require an attendant who periodically stops the device and cleans the ice therefrom.

The present device includes a housing having a mixing chamber and a nozzle in communication. Water under pressure and air under pressure are introduced into the mixing chamber where they are mixed to atomize the water after which the atomized water is forced out of the nozzle in some desired pattern. For example, the atomized water may be forced by a helical device into a swirling motion as it leaves the nozzle whereby the period of time during which the droplets of water are suspended in frigid air is extended, thereby, improving the quality of the snow produced. The nozzle and a substantial portion of the housing are surrounded by a jacket which serves as an insulator to prevent freezing of water particles or moisture on the nozzle. Water is introduced into the jacket under pressure at the nozzle end thereof and flows therethrough to approximately the rear end of the housing where it enters the mixing chamber. Substantially no portion of the nozzle extends outside of the water jacket and, therefore, the circulating water in the water jacket prevents the formation of any ice on the nozzle. Also, the amount of water flowing into the mixing chamber can be varied to change the type or amount of snow being produced.

It is an object of the present invention to provide a new and improved snow making nozzle.

It is a further object of the present invention to provide a snow making nozzle upon which ice will not form to distort the snow pattern produced thereby.

It is a further object of the present invention to provide a snow making nozzle which produces a swirling spray and, thus, a better grade of snow.

It is a further object of the present invention to provide a snow making nozzle which can be varied somewhat to produce different amounts and qualities of snow.

These and other objects of this invention will become apparent to those skilled in the art upon consideration of the accompanying specification, claims, and drawings.

Referring to the drawings wherein like characters indicate like parts throughout the figures:

FIG. 1 illustrates an embodiment of the present device in axial section, portions thereof shown in elevation;

FIG. 2 is an end view of the device as seen from the left end thereof in FIG. 1;

FIG. 3 is a sectional view as seen from the line 3—3 in FIG. 1;

FIG. 4 is a sectional view as seen from the line 4—4 in FIG. 1; and

FIG. 5 is an end view as seen from the right end of the device in FIG. 1.

In the figures the numeral 10 generally designates an elongated hollow cylindrical housing the right end of which is tapered at 12 to form a nozzle-like outlet 11 and the left end of which is threaded at 13. In the present embodiment the housing 10 is constructed of 2" double strength pipe, however, it should be understood that it might be constructed of any suitable material. A 2" to 1" pipe reducer 14 is threadedly engaged on the threads 13 at the left end of the housing 10 and has a 1" conduit 15 threadedly engaged therein. The conduit 15 is adapted to conduct air under pressure into the housing 10 and may be a flexible tubing or the like to allow movement of the snow making device.

The housing 10 forms a mixing chamber 20 therein adjacent the left end, which chamber 20 receives the air under pressure from the conduit 15. An opening 21 in the side of the housing 10 adjacent the threaded portion 13 is adapted to allow water under pressure to enter the mixing chamber 20 at an angle to the flow of air entering the mixing chamber 20 from the conduit 15. The inlet 21 is approximately a ½" diameter hole in this embodiment. The air striking the water in the chamber 20 causes the water to be atomized, or broken up into small particles, which particles are then forced out the outlet 11. The right end of the housing 10 is tapered at 12 at an angle which provides a smooth flow of the atomized water into the outer air. The axial length of the tapered portion is approximately 3" in this embodiment. In the present embodiment the opening 11 has approximately a ⅜" diameter to provide the desired distribution of the atomized water. Providing the device with a relatively small opening 11 produces the best mixture of air and water in the chamber 20 while directing the mixture in a desirable pattern to cover the greatest area with snow.

A cylindrical shaped helical spring 25 having an outside diameter approximately equal to the inside diameter of the housing 10 is positioned in the housing 10 with the right end thereof adjacent the tapered portion 12 of the housing 10 and the left end thereof extending to the central portion of the housing 10. As the atomized water is forced out of the mixing chamber 20 the helical spring 25 imparts a spiral motion thereto so that it leaves the opening 11 in a swirling or spiraling motion. This spiraling motion of the atomized water provides the present device with several advantages. Since the droplets of water leaving the opening 11 are following a spiral path they remain in the air a greater length of time and, therefore, there is a greater chance for the droplets to freeze properly. In addition, the spiraling or swirling of the atomized water as it leaves the opening 11 provides a better pattern and produces a more uniform coverage of the area with snow. While a helical spring 25 is utilized in the present embodiment, it should be understood that the present device would operate if a permanent cylindrical helix were fixedly attached to the inner wall of the housing 10 or any other type of device were inserted in the housing 10 to impart a swirling motion to the atomized water leaving the opening 11.

An elongated hollow cylindrical outer casing or jacket 30 having an inner radius somewhat larger than the outer radius of the housing 10 is coaxially positioned around the housing 10. In the present embodiment the jacket 30 is constructed from a piece of 3" double strength pipe. However, it should be understood that any suitable material for making a jacket having the desired strength and characteristics could be utilized and would be within the scope of this invention. The jacket 30 extends approximately the length of the housing 10 and the front end thereof is positioned flush with the forwardmost extremities of the tapered portion 12. A front wall 31 extending radially outwardly from the forwardmost extremities of the tapered portion 12 of housing 10 is fixedly attached to the front end of the jacket 30 to provide a water-tight connection between the housing 10 and the jacket 30. The front wall 31 is constructed of a disk of material having a central opening therein which is concentric with the opening 11 and the disk is attached to the housing 10 and the jacket 30 by some means such as welding or the like. A rear wall 32 extends radially outwardly from the housing 10 adjacent the threads 13 and is joined to the rear end of the jacket 30 to produce a water-tight compartment 33 between the jacket 30 and the housing 10. The wall 32 is constructed of a disk of material having a central opening therethrough with a diameter approximately equal to the outer diameter of the housing 10. The disk forming the wall 32 is fixedly attached to the housing 10 and the jacket 30 by some means such as welding or the like.

The jacket 30 has an opening 35 therein, which in this embodiment is approximately a 1" diameter hole, adjacent the front wall 31. A pipe reducer 36 having a passage therethrough with a ¾" diameter at the inlet and a 1" diameter at the outlet is fixedly attached to the outer surface of the jacket 30 with the outlet thereof coaxial and adjacent to the opening 35. A conduit 37 is threadedly engaged in the inlet of the pipe reducer to provide a means for conducting water to the jacket 30. A valve means 38 is interposed in the conduit 37 so that the amount of water flowing into the jacket 30 may be regulated. In this embodiment the valve means 38 is a simple hand valve, however, it should be understood that the valve means 38 could be any means for regulating the amount of water flowing in the conduit 37. Thus, a passage for water is provided through conduit 37, pipe reducer 36, jacket 30, inlet 21 and mixing chamber 20.

In the operation of the snow making device air under pressure is applied to the conduit 15 and water under pressure is applied to the conduit 37. In general the pressure of air will be in the range of approximately 80 to 110 lbs., however, it might be varied somewhat from these figures and the device would still operate for given conditions. The pressure of the water applied to the conduit 37 should be in the range of approximately 100 to 250 lbs. but again these figures may vary somewhat for certain conditions. As water flows through conduit 37 and fills the jacket 30 some of the water is forced through the inlet 21 and strikes the air under pressure entering the mixing chamber 20 from the conduit 15. The water and air enter the chamber 20 at an angle of approximately 90° therebetween. As the water and air strike in the mixing chamber 20 an atomizing or mixing effect takes place in which the water is broken up into very fine particles and driven with the air toward the front end of the housing 10. The helical spring 25 operates somewhat like rifling and provides the atomized water and air with a swirling or spiraling motion as it leaves the opening 11. The snow making device should be operated in a temperature no higher than 29° F. and a somewhat lower temperature is desirable. When higher atmospheric temperatures prevail less water should be introduced into the mixing chamber 20 so that a finer spray will be produced, thereby, producing a drier snow. As the atmospheric temperature decreases (within limits) the valve 38 may be opened to allow more water to flow into the mixing chamber 20.

The water flowing in the jacket 30 enters adjacent the front wall 31 and flows into the mixing chamber 20 adjacent the rear wall 32. Therefore, during operation water is flowing steadily throughout substantially the entire jacket 30. This water flowing in the jacket 30 maintains the jacket 30 at substantially the temperature of the water and insulates the housing 10 from the exterior temperatures. Since the front wall 31 is flush with the forwardmost extremities of the housing 10, the entire housing 10 is insulated and moisture will not freeze adjacent the opening 11 as in prior art devices, which freezing distorts the snow pattern of the atomized water from the opening 11 and eventually can completely close opening 11. Thus, the type of snow produced by the present device can be varied by changing the pressure of the air, the pressure of the water, and/or the amount of water applied thereto. Also, the atomized water leaves the opening 11 in the present device in a novel pattern which provides a much more uniform coverage of snow over any given area. In addition, the present device is uniquely constructed so that no freezing of moisture occurs thereon to distort the pattern or interfere with the snow making process.

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

What is claimed is:

1. A snow making device comprising:
   (a) an elongated hollow cylindrical housing tapering at one end into a nozzle-like outlet and having a first inlet adjacent the other end adapted to have air under pressure applied thereto;
   (b) said housing forming a mixing chamber between said nozzle-like outlet and said first inlet;
   (c) a second inlet in said housing in communication with said mixing chamber and adapted to have water under pressure applied thereto, said second inlet being further characterized by lying adjacent and at an angle to said first inlet so water entering said mixing chamber is atomized by air entering the chamber and forced out said nozzle-like outlet;
   (d) an outer liquid tight jacket partially surrounding said housing and in communication with said second inlet, said jacket providing an insulating covering around said nozzle-like outlet for preventing said outlet from freezing closed during operation;
   (e) said outer jacket having an inlet positioned adjacent the nozzle-like outlet adapted to have water under pressure applied thereto and valve means attached to said jacket inlet for controlling the amount of water entering said jacket; and (f) said outer jacket extending approximately the length of the housing and the front end thereof being approximately flush with the forwardmost extremities of the nozzle-like outlet so substantially no portion thereof protrudes out of said jacket.

2. A snow making device substantially as set forth in claim 1 having in addition a helical shaped member positioned in the housing between the mixing chamber and the nozzle-like outlet for imparting a swirling motion to atomized water passing out through said nozzle-like outlet.

3. A snow making device substantially as set forth in claim 2 wherein the helical shaped member is a helical shaped cylindrical spring having an outside diameter approximately the same as the inside diameter of the housing.

4. A snow making device substantially as set forth in claim 1 wherein the first inlet has air applied thereto under a pressure in the range of approximately 80 to 110 lbs. and the jacket inlet has water applied thereto under a pressure in the range of approximately 100 to 250 lbs.

References Cited

UNITED STATES PATENTS

| | | | |
|---|---|---|---|
| 441,048 | 11/1890 | Bacon et al. | 239—487 |
| 1,818,471 | 8/1931 | Geauque | 239—487 X |
| 2,324,147 | 7/1943 | Gendron | 239—487 |
| 2,396,968 | 3/1946 | Phillips | 239—128 X |
| 3,010,660 | 11/1961 | Barrett | 239—434 |
| 3,298,612 | 1/1967 | Torrens | 239—2 |

M. HENSON WOOD, JR., *Primary Examiner.*

H. NATTER, *Assistant Examiner.*